United States Patent
Nakane et al.

(10) Patent No.: US 6,868,743 B2
(45) Date of Patent: Mar. 22, 2005

(54) HIGHLY RELIABLE TORQUE SENSOR

(75) Inventors: Naoki Nakane, Toyota (JP); Shigetoshi Fukaya, Toyota (JP)

(73) Assignees: Denso Corporation, Kariya (JP); Nippon Soken Inc., Nishio (JP)

( * ) Notice: Subject to any disclaimer, the term of this patent is extended or adjusted under 35 U.S.C. 154(b) by 0 days.

(21) Appl. No.: 10/705,961

(22) Filed: Nov. 13, 2003

(65) Prior Publication Data

US 2004/0093961 A1 May 20, 2004

(30) Foreign Application Priority Data

Nov. 14, 2002 (JP) ........................................ 2002-330461
Nov. 14, 2002 (JP) ........................................ 2002-330462

(51) Int. Cl.[7] .............................. G01L 3/02; G01L 3/10
(52) U.S. Cl. .............................. 73/862.331; 73/862.332
(58) Field of Search ...................... 73/862.331, 862.332, 73/862.333, 862.335, 862.336

(56) References Cited

U.S. PATENT DOCUMENTS

| | | | |
|---|---|---|---|
| 4,891,567 A | * | 1/1990 | Fujitani et al. ............. 318/254 |
| 4,984,474 A | | 1/1991 | Matsushima et al. |
| 2002/0189371 A1 | | 12/2002 | Nakane et al. |

FOREIGN PATENT DOCUMENTS

| | | |
|---|---|---|
| JP | 63-153439 | 6/1988 |
| JP | 63-158433 | 7/1988 |
| JP | 2-93321 | 4/1990 |
| JP | 6-11402 | 1/1994 |
| JP | 6-281513 | 10/1994 |
| JP | 8-159887 | 6/1996 |
| JP | 2003-149062 | 5/2003 |
| WO | WO 02/071019 A1 | 9/2002 |

* cited by examiner

*Primary Examiner*—Edward Lefkowitz
*Assistant Examiner*—Lilybett Martir
(74) *Attorney, Agent, or Firm*—Posz & Bethards, PLC

(57) ABSTRACT

A torque sensor is provided which consists of a magnet, an assembly of magnetic rings, and a magnetic sensor. The magnetic rings have claws arrayed thereround at regular intervals. Each of the claws of one of the rings is interposed between adjacent two of the claws of the other ring. Upon input of torque, the magnet is rotated relative to the ring assembly, thereby causing the density of magnetic flux to change as a function of the torque which is sensed by the magnetic sensor. Each of the claws is geometrically shaped so as to increase the density of magnetic flux flowing through the ring assembly, thereby improving the sensitivity of the sensor.

7 Claims, 5 Drawing Sheets

NEUTRAL POSITION

HIGHLY RELIABLE TORQUE SENSOR

BACKGROUND OF THE INVENTION

1. Technical Field of the Invention

The present invention relates generally to a torque sensor which may be employed to measure torque transmitted to a steering shaft of automotive electric power steering devices, and more particularly to an improved structure of such a torque sensor which is simple and high in operational reliability.

2. Background Art

Japanese Patent First Publication No. 8-159887 teaches a torque sensor including a magnet and a magnetic sensor. The magnet and the magnetic sensor are so secured to ends of a torsion bar that they are moved relative to each other upon twisting of the torsion bar. The magnetic sensor works to produce an output as a function of the torque applied to the torsion bar.

Japanese Patent First Publication No. 6-281513 teaches a torque sensor which, like the above publication, includes a magnet and a magnetic sensor. The torque sensor also includes a torque converting gear mechanism which works to convert the torsion of a torsion bar into movement of a gear in a longitudinal direction of input and output shafts. The magnetic sensor is secured to a housing, thereby eliminating the need for electric contact parts such as brushes and a slip ring used to supply power to the magnetic sensor and pick up a signal from the magnetic sensor.

The former torque sensor has the magnet and the magnetic sensor connected to the torsion bar, thus requiring electric contact parts such as brushes and a slip ring used to supply power to and pick up a signal from the magnetic sensor, which leads to a greater concern about the reliability of the sensor.

The latter torque sensor has the disadvantage that the backlash or wear of the torque converting gear mechanism may result in error or delay in measurement of the torque.

SUMMARY OF THE INVENTION

It is therefore a principal object of the invention to avoid the disadvantages of the prior art.

It is another object of the invention to provide a torque sensor which is simple in structure and high in operational reliability.

According to one aspect of the invention, there is provided a torque sensor which may be employed in measuring the torque applied to a steering shaft of an electric power steering device for automotive vehicles. The torque sensor comprises: (a) a first shaft; (b) a second shaft; (c) an elastic member coupling the first shaft to the second shafts in alignment with each other, upon input of torque, the elastic member undergoing torsion; (d) a hard magnetic member joined to the first shaft, the hard magnetic member having magnetic poles arrayed on a periphery thereof to produce a magnetic field therearound; (e) an assembly of a first and a second soft magnetic member which is joined to the second shaft and placed around the hard magnetic member within the magnetic filed produced by the hard magnetic member to form a magnetic circuit so that upon a change in position of the first and second magnetic members relative to the hard magnetic member arising from the torsion of the elastic member, density of magnetic flux developed within the magnetic circuit changes; and (f) a magnetic sensor placed in non-contact with the first and second soft magnetic members. The magnetic sensor works to measure the density of magnetic flux within the magnetic circuit. The first and second soft magnetic members are opposed to each other through a given gap in a direction of the alignment of the first and second shafts. The first and second soft magnetic members have as many claws as the poles of the hard magnetic member which are arrayed at regular intervals on peripheries of the first and second soft magnetic members, respectively. Each of the claws of the first soft magnetic member is interposed between adjacent two of the claws of the second soft magnetic member. Each of the claws has a base portion and a head portion to have substantially a trapezoidal shape. The base portion has a width A extending in a circumferential direction of the first and second soft magnetic members. The head portion has a width B extending in the circumferential direction which is smaller than the width A. The widths A and B are selected to meet relations below.

$$0.6 \times F < L < 1.2 \times F$$

$$A < 0.5 \times P$$

$$B < 0.15 \times P$$

where F is a distance between the first and second soft magnetic members in the direction of the alignment of the first and second shafts, L is a length of each of the claws from the base portion to the head portion, and P is a distance between one of outer edges of each of the claws of the first soft magnetic member and one of outer edges of an adjacent one of the claws of the second magnetic member which lies on the same side as the first soft magnetic member in the circumferential direction of the first and second soft magnetic members.

Upon input of torque, the elastic member twists, thus resulting in a shift in position between the assembly of the first and second soft magnetic member and the hard magnetic member which causes the density of magnetic flux flowing in the magnetic circuit to change. The magnetic sensor is responsive to such a change to produce an output as a function of the torque applied to the elastic member. This structure eliminates the need for the magnetic sensor to measure the density of magnetic flux directly emerging from the hard magnetic member, thus enabling the magnetic sensor to be installed to be stationary. This eliminates the need for electric parts used in contact with the magnetic sensor, thus resulting in improved reliability of operation of the torque sensor.

Additionally, the satisfaction of the above relation among the widths A and B, the distance F, the length L, and the distance P allows the interval between the top of the claws of the first soft magnetic member and the second shaft magnetic member and the interval between adjacent two of the claws of the first and second soft magnetic members to be selected as to increase the density of magnetic flux produced in the first and second soft magnetic members. This results in improved sensitivity of the magnetic sensor.

In the preferred mode of the invention, the torque sensor may further include auxiliary soft magnetic members which have magnetic flux collecting portions, respectively, which serve to collect the magnetic flux from the first and second soft magnetic members at the magnetic sensor. This permits the magnetic sensor to measure the average of the density of magnetic flux produced over the periphery of the assembly of the first and second soft magnetic members.

Each of the first and second soft magnetic members has a ring-shaped flange to which the claws are affixed. The base portion of each of the claws extends from the ring-shaped flange. The head portion extends from the base portion. This structure facilitates ease of arrangement of the claws over the periphery of each of the first and second soft magnetic members at equi-intervals.

The magnetic sensor is disposed within the given gap between the first and second soft magnetic members to measure the density of magnetic flux flowing between the first and second soft magnetic members. Specifically, when the twisting of the elastic member causes the hard magnetic member to be moved relative to the assembly of the first and second soft magnetic members, the claws of the first soft magnetic member move close to the N-poles or S-poles, while the claws of the second soft magnetic member move close to the S-poles or N-poles of the hard magnetic member, thereby causing magnetic fluxes having opposite polarities to flow through the first and second soft magnetic members, respectively. This causes plus and minus densities of magnetic fluxes to be created within the gap between the first and second soft magnetic members which are substantially proportional to the degree of torsion of the elastic member. The determination of the degree of magnetic flux proportional to the degree of torsion of the elastic member is, thus, achieved by exposing the magnetic sensor to the magnetic fluxes between the first and second soft magnetic members.

The magnetic flux collecting portions of the auxiliary soft magnetic members are opposed to each other in the direction of alignment of the first and second shafts. The magnetic sensor is interposed between the magnetic flux collecting portions to measure the density of magnetic flux flowing between the first and second soft magnetic members through the magnetic flux collecting portions. This increases the efficiency of measuring the density of magnetic flux.

According to another aspect of the invention, there is provided a torque sensor which comprises: (a) a first shaft; (b) a second shaft; (c) an elastic member coupling the first shaft to the second shafts in alignment with each other, upon input of torque, the elastic member undergoing torsion; (d) a hard magnetic member joined to the first shaft, the hard magnetic member having magnetic poles arrayed on a periphery thereof to produce a magnetic field therearound; (e) an assembly of a first and a second soft magnetic member which is joined to the second shaft and placed around the hard magnetic member within the magnetic filed produced by the hard magnetic member to form a magnetic circuit so that upon a change in position of the first and second magnetic members relative to the hard magnetic member arising from the torsion of the elastic member, density of magnetic flux developed within the magnetic circuit changes; and (f) a magnetic sensor placed in non-contact with the first and second soft magnetic members, working to measure the density of magnetic flux within the magnetic circuit. The first and second soft magnetic members are opposed to each other through a given gap in a direction of the alignment of the first and second shafts. The first and second soft magnetic members have as many claws as the poles of the hard magnetic member which are arrayed at regular intervals on peripheries of the first and second soft magnetic members, respectively. Each of the claws of the first soft magnetic member is interposed between adjacent two of the claws of the second soft magnetic member. Each of the claws has a base portion and a head portion. The base portion has a width A extending in a circumferential direction of the first and second soft magnetic members which is greater than a width of the head portion extending in the circumferential direction. The width A and a distance P between one of outer edges of each of the claws of the first soft magnetic member and one of outer edges of an adjacent one of the claws of the second magnetic member which lies on the same side as the first soft magnetic member in the circumferential direction of the first and second soft magnetic members meet a relation of $0.5 \times P < A < P$.

Upon input of torque, the elastic member twists, thus resulting in a shift in position between the assembly of the first and second soft magnetic member and the hard magnetic member which causes the density of magnetic flux flowing in the magnetic circuit to change. The magnetic sensor is responsive to such a change to produce an output as a function of the torque applied to the elastic member. This structure eliminates the need for the magnetic sensor to measure the density of magnetic flux directly emerging from the hard magnetic member, thus enabling the magnetic sensor to be installed to be stationary. This eliminates the need for electric parts used in contact with the magnetic sensor, thus resulting in improved reliability of operation of the torque sensor.

Additionally, the satisfaction of the above relation among the width A and the distance P ensures improved linearity of a changing density of magnetic flux to be measured by the magnetic sensor.

In the preferred mode of the invention, the torque sensor may further include an auxiliary soft magnetic member which has a magnetic flux collecting portion serving to collect the magnetic flux from the first and second soft magnetic members at the magnetic sensor. This permits the magnetic sensor to measure the average of the density of magnetic flux produced over the periphery of the assembly of the first and second soft magnetic members.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 3($b$) is a side view of FIG. 3($a$);

FIG. 4($d$) is a graph which shows a relation between the density of magnetic flux and a torsional angle of a torsion bar (i.e., an angular shift between the magnet and the magnetic rings as illustrated in FIGS. 3($a$) and 3($b$)) in terms of an ambient temperature;

DESCRIPTION OF THE PREFERRED EMBODIMENTS

Figure 1:
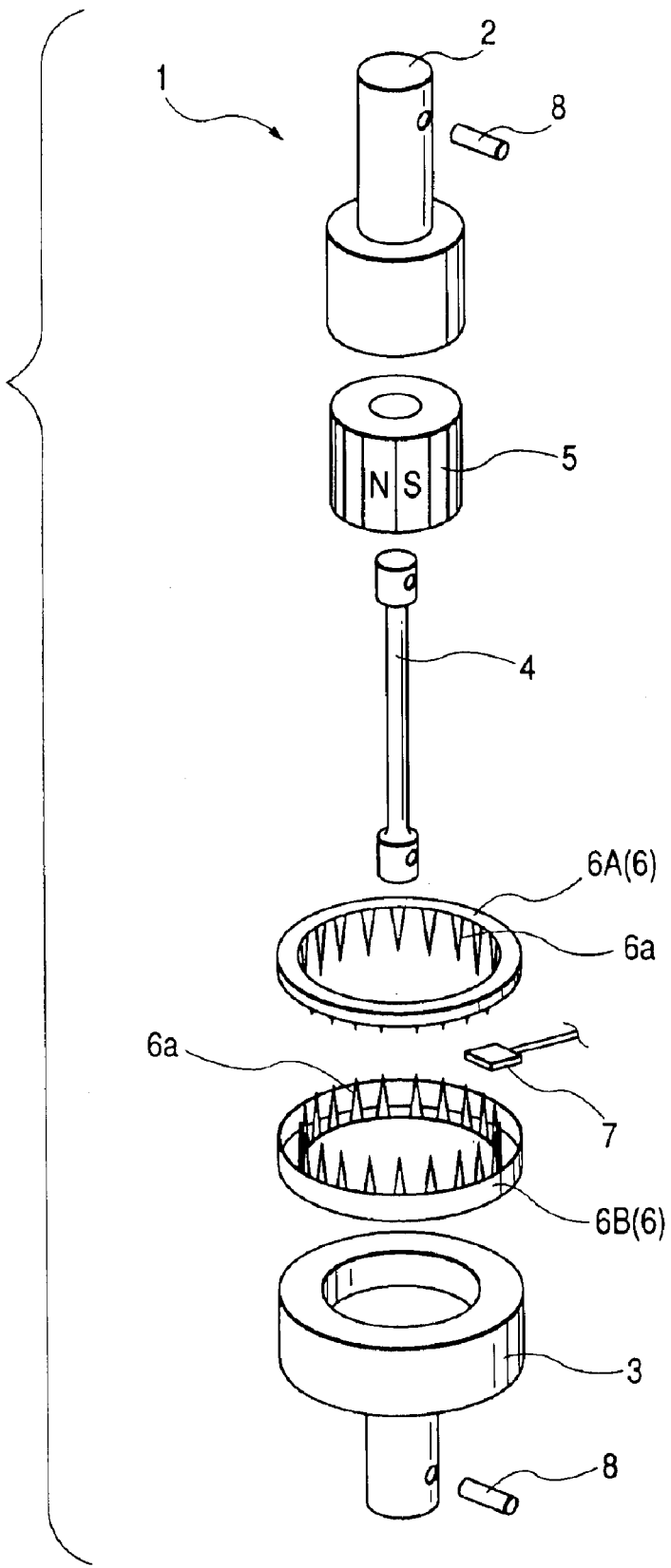
FIG. 1 is a perspective exploded view which shows a torque sensor according to the first embodiment of the invention.

Referring to the drawings, wherein like reference numbers refer to like parts in several views, particularly to FIG. 1, there is shown a torque sensor 1 according to the first embodiment of the invention which may be employed in an electric power steering device for automotive vehicles. The following discussion will refer to, as an example, a case where the torque sensor 1 is installed in the electric power steering device.

The torque sensor 1 is disposed between an input shaft 2 (i.e., a steering shaft of the vehicle) and an output shaft 3 and works to measure torque transmitted to the input shaft 2 which is produced by turning a steering wheel of the vehicle.

The torque sensor 1 consists essentially of a torsion bar 4 (elastic member), a magnet assembly 5 made of a hard magnetic material, a pair of magnetic yokes 6 made of a soft magnetic material, and a magnetic sensor 7. The torsion bar 4 couples the input shaft 2 and the output shaft 3 together in alignment to each other. The magnet assembly 5 is installed on an end of the input shaft 2. The magnetic yokes 6 are retained by a yoke holder 9 and joined to an end of the output shaft 3. The magnetic sensor 7 works to measure the density of magnetic flux flowing between the magnetic yokes 6.

The torsion bar 4 is joined at ends thereof to the input shaft 2 and the output shaft 3 through pins 8 so that it exhibits a required input torque-to-torsion characteristic. Twisting of the torsion bar 4 causes the input shaft 2 to rotate or twist relative to the output shaft 3.

The magnet assembly 5 is of a ring-shape and consists of, for example, twenty four (24) poles having N-faces and S-faces arrayed alternately around the outer periphery thereof.

Figure 2:
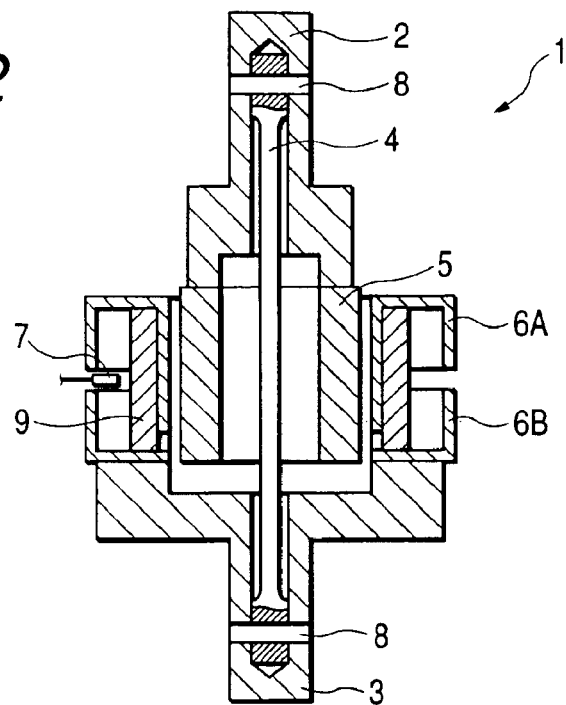
FIG. 2 is a longitudinal sectional view which shows the torque sensor as illustrated in FIG. 1.

The pair of magnetic yokes 6 (as will also be denoted as 6A and 6B below), as shown in FIG. 1, are made of annular members disposed in the vicinity of the periphery of the magnetic assembly 5. Each of the magnetic yokes 6 is made up of an annular flange and as many claws 6a as the poles (N- and S-poles) of the magnetic assembly 5 arrayed over the circumference of the flange at regular intervals. The yoke holder 9, as shown in FIG. 2, retains the magnetic yokes 6 so that each of the claws 6a of one of the magnetic yokes 6 is located between adjacent two of the claws of the other magnetic yoke 6 in a circumferential direction thereof.

Figure 3A:
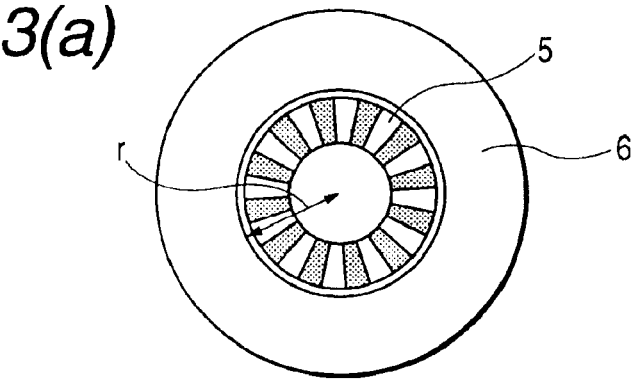
FIG. 3($a$) is a transverse sectional view which shows a magnet assembly and an assembly of magnetic rings installed in the torque sensor of FIG. 1.
Figure 3B:
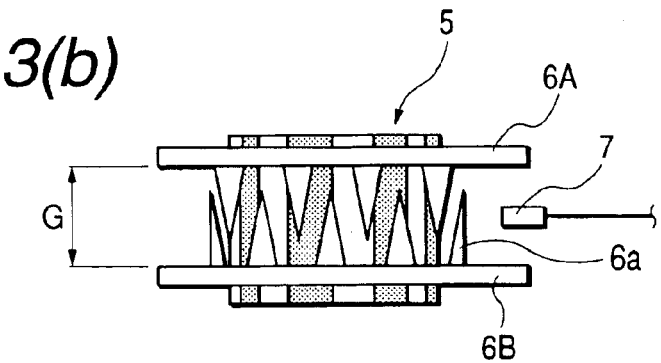

The magnetic yokes 6 and the magnet assembly 5 are so positioned that each of longitudinal center lines of the claws 6a of the magnetic yokes 6, as clearly shown in FIG. 3(b), coincides with a boundary of the N-pole and S-pole in a condition where the torsion bar 4 is not twisted, that is, torsion or torque is not developed between the input and output shafts 2 and 3.

The magnetic sensor 7 is, as clearly shown in FIG. 3, disposed within a gap G between the magnetic yokes 6A and 6B opposed to each other in a longitudinal direction of the torque sensor 1 (i.e., a direction of alignment of the input and output shafts 2 and 3) and works to measure the density of magnetic flux flowing between the magnetic yokes 6A and 6B. The magnetic sensor 7 is secured rigidly by a sensor housing (not shown) at a given interval away from the magnetic yokes 6A and 6B.

The magnetic sensor 7 may be made of a Hall IC or a magnetoresistor which works to convert the magnetic flux density into an electric signal and output it.

Figure 4A:
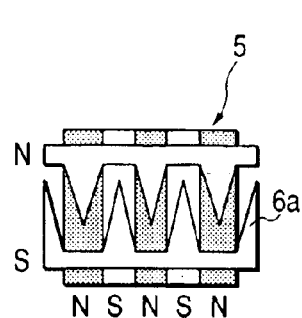
FIGS. 4($a$), 4($b$), and 4($c$) are views each of which shows a positional relation between the magnet and the magnetic rings as illustrated in FIGS. 3($a$) and 3($b$)
Figure 4B:
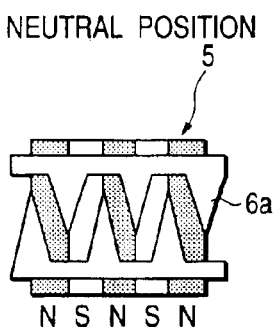

In operation, when the torque sensor 1 is in a neutral position where the torque is not inputted to the input shaft 2, that is, the torsion bar 4 is not twisted, the longitudinal center line of each of the claws 6a of the magnetic yokes 6, as clearly illustrated in FIG. 4(b), coincides with one of the boundaries of the N-poles and S-poles of the magnet assembly 5. In this case, as many magnetic lines of force as the poles (N- and S-poles) of the magnet assembly 5 pass through the claws 6a of each of the magnetic yokes 6, so that they are closed in the magnetic yokes 6A and 6B. This cause no magnetic flux to leak into the gap G between the magnetic yokes 6A and 6B, so that the magnetic sensor 7 detect magnetic flux density of zero (0), as illustrated in FIG. 4(d).

Figure 4C:
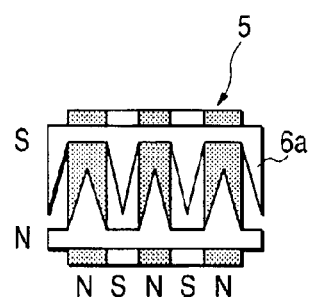
Figure 4D:
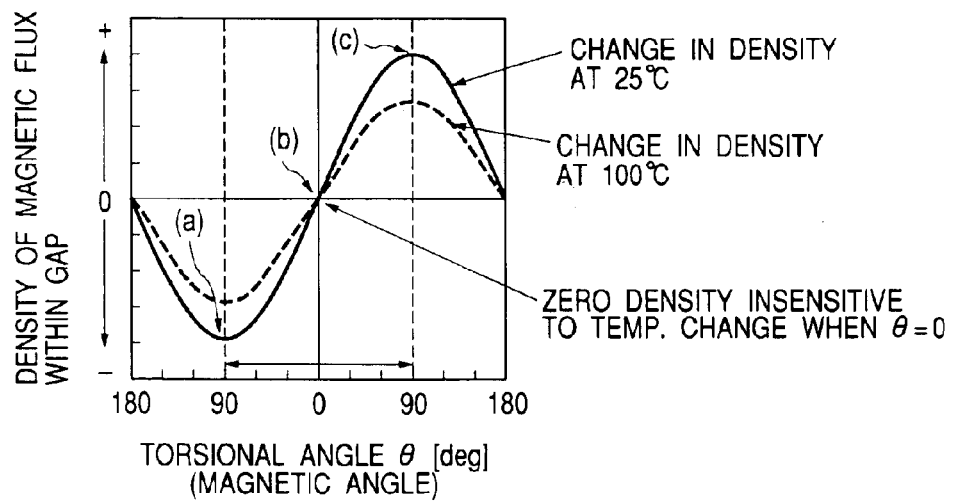

When the torque is applied to the input shaft 2, so that the torsion bar 4 is twisted, it will cause the magnet assembly 5 installed on the input shaft 2 to rotate relative to the magnetic yokes 6 secured on the output shaft 3, thereby resulting in, as shown in FIG. 4(a) or 4(c), shifting between the claws 6a and the boundaries of the magnetic poles (N- and S-poles) of the magnet assembly 5, so that the magnetic lines of force having an N- or S-polarity are increased in the magnetic yokes 6. Specifically, the magnetic lines of force in the magnetic yoke 6A is reverse in polarity to the magnetic lines of force in the magnetic yoke 6B, thus causing the density of magnetic flux to be created in the gap G between the magnetic yokes 6A and 6B which is, as shown in FIG. 4(d), substantially proportional to the degree of torsion of the torsion bar 4 and reversed in polarity upon reversal of the direction in which the torsion bar 4 is twisted. The magnetic sensor 7 senses the density of magnetic flux and outputs an electric signal indicative thereof.

As apparent from the above discussion, the torque sensor 1 is so designed that when the torsion bar 4 is twisted, and the magnet assembly 5 is shifted relative to the magnetic yokes 6 in the circumferential direction thereof, it results in a change in density of magnetic flux between the magnetic yokes 6 over the circumference thereof. Specifically, the density of magnetic flux will be uniform over the circumference of the magnetic yokes 6. It is, thus, possible for the magnetic sensor 7 to detect the density of magnetic flux correctly anywhere in the gap G between the magnetic yokes 6A and 6B without any physical interference with the magnetic yokes 6A and 6B. This eliminates the need for electric contact parts such as a slip ring and brushes in the magnetic sensor 7, thus ensuring the reliability of operation of the torque sensor 1.

We performed tests, as described below, on the geometry of the magnetic yokes 6 in order to increase the density of magnetic flux produced therein within a measuring range of the magnetic sensor 7.

Figure 5:
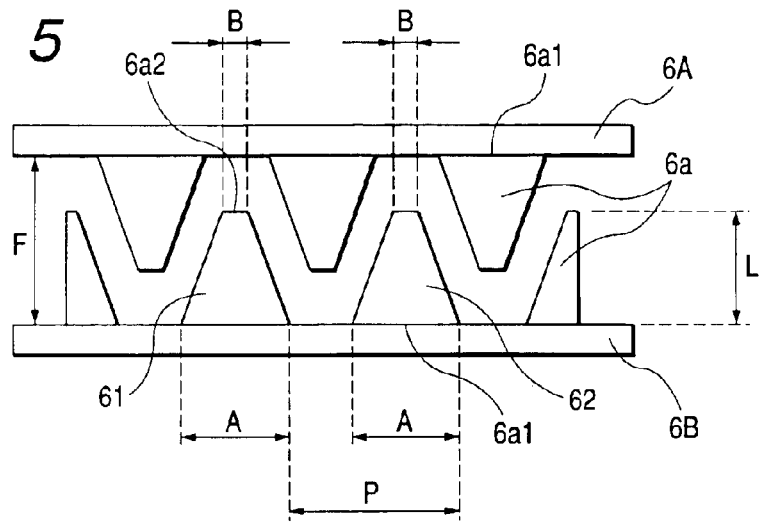
FIG. 5 is an enlarged view which shows magnetic rings.

We prepared some test pieces of the magnetic yokes 6, as shown in FIG. 5. Each of the claws 6a is substantially trapezoidal in shape and made up of a base portion 6a1 and a head portion 6a2 and symmetric with respect to a center line thereof extending parallel to the longitudinal center line of the torque sensor 1. The base portion 6a1 has the width A greater than the width B of the head portion 6a2 in the circumferential direction of the magnetic yokes 6. The with B may alternatively be zero (0). In other words, each of the claws 6a may be of substantially a triangular shape.

Under the experimental conditions where the number of poles of the magnet assembly 5 is twenty four (24), the inner diameter r, as shown in FIG. 3(a), of the magnetic yokes 6 is 31 mm, and the distance F between the magnetic yokes 6A and 6B in the direction parallel to the longitudinal direction of the torque sensor 1 is 8 mm, we rotated the test pieces of the magnetic yokes 6 through 2.5 degrees from the neutral position in the circumferential direction thereof and measured the density of magnetic flux created for different values of the width. A of the base portion 6a 1, the width B of the head portion 6b2, and the length L of the claws 6a. Results of the tests are shown in table 1 below.

TABLE 1

|  | A (mm) | B (mm) | L (mm) | Density (mT) |
|---|---|---|---|---|
| 1st test | 5.5 | 1.9 | 7 | 14.80 |
| 2nd test | 5.5 | 1.9 | 9 | 17.14 |
| 3rd test | 3.7 | 1.5 | 5 | 18.39 |
| 4th test | 4.6 | 1.2 | 7 | 19.25 |
| 5th test | 3.7 | 1.9 | 7 | 21.10 |

Comparison between the first and fifth tests in table 1 shows that the density of magnetic flux in the magnetic yokes 6 greatly depends upon the width A of the base portions 6a1 of the claws 6a. Comparison between the first and second tests shows that the density of magnetic flux in the magnetic yokes 6 greatly depends upon the length L of the claws 6. It is, thus, found that the density of magnetic flux produced in the magnetic yokes 6 is sensitive to the width A of the base portions 6a1 and the length L of the claws 6a.

Next, we prepared four test pieces, as listed in table 2 below, which have different values of the length L of the claws 6a and different values of the width A of the base portion 6a1 of the claws 6a, rotated the test pieces of the magnetic yokes 6 through 2.5 degrees from the neutral position, and measured the density of magnetic flux in each of the test pieces under the same experimental conditions as described above.

TABLE 2

|  |  | A (mm) | | |
|---|---|---|---|---|
|  |  | 1st test 3.2 | 2nd test 3.7 | 3rd test 4.2 |
| L (mm) | 1st test 6.5 | 19.38 (mT) | 19.91 (mT) | 19.52 (mT) |
|  | 2nd test 7.0 | 20.06 (mT) | 20.31 (mT) | 19.94 (mT) |
|  | 3rd test 7.5 | 19.56 (mT) | 19.78 (mT) | 19.84 (mT) |
|  | 4th test 8.0 | 19.68 (mT) | 19.78 (mT) | 18.94 (mT) |

Table 2 shows that the density of magnetic flux produced in the magnetic yokes 6 has a maximum value in the second test piece in which the length L of the claws 6 is 7.0 mm, and the width A of the base portions 6a1 of the claws 6 is 3.7 mm.

It is, thus, found that an optimum value of the length L of the claws 6 is 7 mm.

The theory on increasing of the density of magnetic flux produced in the magnetic yokes 6 will be described below.

When the length L of the claws 6 is changed in proportional to the distance F between the magnetic yokes 6A and 6B, a flow and amount of magnetic flux between the magnet assembly 5 and the magnetic yokes 6 remain unchanged.

Comparison between the second and third tests in table 1 shows that the test piece in which the length L is 9 mm is greater in density of magnetic flux than the test piece in which the length L is 5 mm. The distance F between the magnetic yokes 6A and 6B of the torque sensor 1 of this embodiment has a constant value of 8 mm. Constants of proportion of the length L of the claws 6 to the distance F in the second and third test pieces are, thus, obtained by dividing the length L by 8 mm, which are listed below.

$$L(5 \text{ mm})/F(8 \text{ mm})=0.625 \quad (1)$$

$$L(9 \text{ mm})/F(8 \text{ mm})=1.125 \quad (2)$$

In the following discussion, adjacent two of the claws 6a of the magnetic yoke 6B will be, as shown in FIG. 5, denoted at numeral 61 and 62. If the width A of the base portion 6a1 of the claws 6 and the distance P between the leftmost edge, as viewed in the drawing, of the base portion 6a1 of the first claw 61 and the leftmost edge of the base portion 6a1 of the second claw 62 are changed, an interval between the first and second claws 61 and 62 in the circumferential direction of the magnetic yokes 6 changes, thus resulting in a change in amount of magnetic flux flowing through the magnet assembly 5 and the magnetic yokes 6.

Since the number n of poles of the claws 6a of each of the magnetic yokes 6 is twelve (12), the distance P between the outermost edges of the base portions 6a1 of the first and second claws 61 and 62 in the circumferential direction of the magnetic yokes 6 may be expressed as $$P(\text{mm})=\pi \times r(31 \text{ mm})/n(12) \approx 8.11 \quad (3)$$

It is, as described above, found from table 2 that the second test piece in which the length L of the claws 6 is 7.0 mm, and the width A of the base portions 6a1 of the claws 6 is 3.7 mm has a maximum density of magnetic flux produced in the magnetic yokes 6. The density of magnetic flux produced in the second test piece varies is represented by a solid curved line in FIG. 6. The density of magnetic flux produced in the third test piece in which the width A is 4.2 mm varies as represented by a sine curve indicated by a broken line in FIG. 6.

Therefore, this embodiment determines a threshold (i.e., an upper limit) of the width A of the base portions 6a of the claws 6 as 4.2 mm used in the third test piece. A constant of proportion of the width A of the base portions 6a1 of the claws 6 to the distance P between the outer edges of the base portions 6a1 of the claw 61 and the claw 62 is, thus, determined as $$A(4.2 \text{ mm})/P(8.11 \text{ mm}) \approx 0.517 \quad (4)$$

If the width B of the head portions 6a2 of the claws 6 and the distance P between the outermost edges of the base portions 6a1 of the first claw 61 and the second claw 62 are changed, the interval between the first and second claws 61 and 62 in the circumferential direction of the magnetic yokes 6 changes, thus resulting in a change in amount of magnetic flux flowing through the magnet assembly 5 and the magnetic yokes 6.

It is found from table 1 that if the width B of the head portions 6a2 is increased more than 1.2 mm, the density of magnetic flux produced in the magnetic yokes 6 decreases. This embodiment, therefore, determines a threshold (i.e., an upper limit) of the width B of the head portions 6a2 as 1.2 mm. A constant of proportion of the width B of the head portions 6a2 of the claws 6 to the distance P between the outer edges of the base portions 6a1 of the claw 61 and the claw 62 is, thus, determined as $$B(1.2 \text{ mm})/P(8.11 \text{ mm}) \approx 0.15 \quad (5)$$

Therefore, if the length L of the claws 6 is, as obtained from Eqs. 1 and 2, defined within a range, as expressed in Eq. 6 below, the width A of the claws 6 is, as obtained from Eq. 4, defined within a range, as expressed in Eq. 7 below, and the width B of the claws 6 is, as obtained from Eq. 5, defined within a range, as expressed in Eq. 8 below, the density of magnetic flux produced in the magnetic yokes 6 has values which fall, as indicated by the solid curved line in FIG. 6, within dead zones where the density of magnetic flux hardly undergoes a change and also has absolute values greater than those on the broken sine curved line within a torque measuring range of the magnetic sensor 7 which is defined between ±15 deg. This results in increased sensitivity of the torque sensor 7 to the density of magnetic flux to be measured. Note that the constants of proportion are determined in consideration for some errors in the experimental data.

$$0.6 \times F < L < 1.2 \times F \tag{6}$$

$$A < 0.5 \times P \tag{7}$$

$$B < 0.15 \times P \tag{8}$$

The torque sensor 1 of this embodiment is, as described above, so designed that the number n of poles of the magnet assembly 5 and a total number n of poles of the magnetic yokes 6 are twenty four (24), the inner diameter r of the magnetic yokes 6 is 31 mm, and the distance F between the magnetic yokes 6A and 6B is 8 mm. Even if the size of the magnetic yokes 6 is changed, so that the number n of poles, the inner diameter r, and the distance F are changed proportional to the change in size of the magnetic yokes 6, the amount and a path of magnetic flux flowing through the magnet assembly 5 and the magnetic yokes 6 remain unchanged. In any case, the density of magnetic flux produced in the magnetic yokes 6, therefore, has absolute values greater than those on the broken sine curved line within the torque measuring range of the torque sensor 1 as long as the conditions, as given by Eqs. 6, 7, and 8, are met.

The density of magnetic flux in the magnetic yokes 6 has been described to show a maximum value when the width A of the base portions 6a1 is 3.7 mm, but it is possible that there are value around 3.7 mm which result in an increase in the density of magnetic flux.

Next, the theory on improvement of linearity of the density of magnetic flux produced in the magnetic yokes 6 will be described below.

Figure 6:
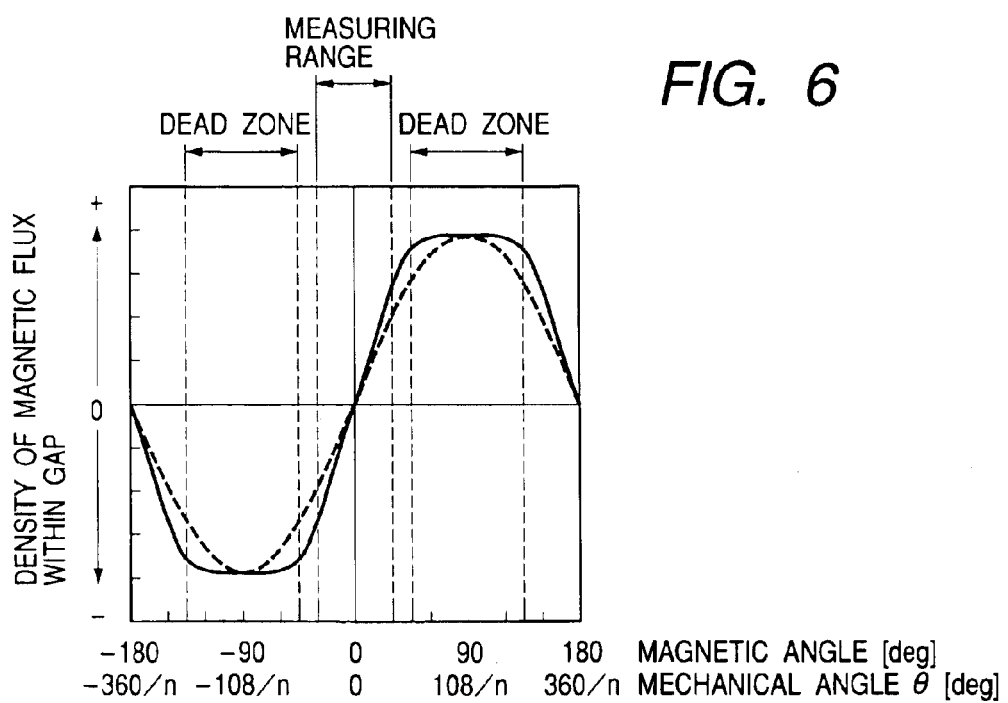
FIG. 6 is a graph which shows a relation between the density of magnetic flux and a torsional angle of a torsion bar (i.e., an angular shift between the magnet and the magnetic rings as illustrated in FIGS. 3($a$) and 3($b$))
Figure 7:
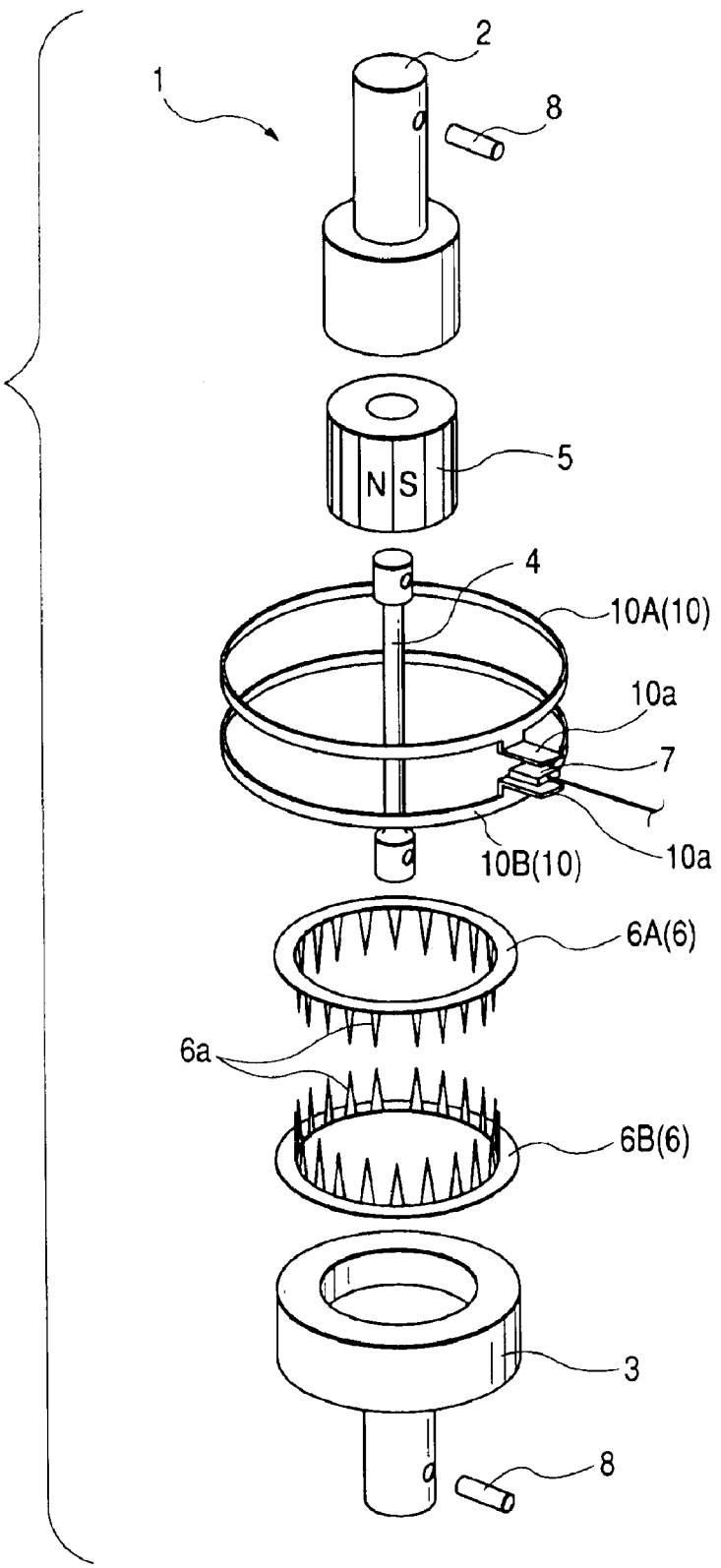
FIG. 7 is a perspective exploded view which shows a torque sensor according to the second embodiment of the invention.

The density of magnetic flux produced in the third test piece, as listed in table 2, in which the width A is 4.2 mm varies, as already above, as represented by the broken sine curved line in FIG. 6. The density of magnetic flux produced in the second test piece in which the length L of the claws 6 is 7.0 mm, and the width A of the base portions 6a1 of the claws 6 is 3.7 mm varies, as represented by the solid curved line in FIG. 6, and has values which fall within the dead zones where the density of magnetic flux hardly undergoes a change. It is, thus, difficult to establish the linearity of the density of magnetic flux within ranges around magnetic angles of ±90 deg. Also, for this reason, this embodiment determines a threshold of the width A of the base portions 6a of the claws 6 as 4.2 mm used in the third test piece. The constant of proportion of the width A of the base portions 6a1 of the claws 6 to the distance P between the outer edges of the base portions 6a1 of the claw 61 and the claw 62 is, as described above, determined as $$A(4.2 \text{ mm})/P(8.11 \text{ mm}) \approx 0.517 \tag{9}$$

By determining the value of the width A to fall within a range, as expressed by Eq. 10 below, a change in the density of magnetic flux generated in the magnetic yokes 6 will conform to the sine curve, as indicated by the broken line in FIG. 6, thereby enabling the magnetic sensor 7 to measure the density of magnetic flux which changes linearly within the torque measuring range.

$$0.5 \times P < A < P \tag{10}$$

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A torque sensor comprising:

a first shaft;

a second shaft;

an elastic member coupling said first shaft to said second shafts in alignment with each other, upon input of torque, said elastic member undergoing torsion;

a hard magnetic member joined to said first shaft, said hard magnetic member having magnetic poles arrayed on a periphery thereof to produce a magnetic field therearound;

an assembly of a first and a second soft magnetic member which is joined to said second shaft and placed around said hard magnetic member within the magnetic filed produced by said hard magnetic member to form a magnetic circuit so that upon a change in position of the first and second magnetic members relative to said hard magnetic member arising from the torsion of said elastic member, density of magnetic flux developed within the magnetic circuit changes; and a magnetic sensor placed in non-contact with said first and second soft magnetic members, working to measure the density of magnetic flux within the magnetic circuit, wherein said first and second soft magnetic members are opposed to each other through a given gap in a direction of the alignment of said first and second shafts, said first and second soft magnetic members having as many claws as the poles of said hard magnetic member which are arrayed at regular intervals on peripheries of said first and second soft magnetic members, respectively, each of the claws of said first soft magnetic member being interposed between adjacent two of the claws of said second soft magnetic member, each of the claws having a base portion and a head portion to have substantially a trapezoidal shape, the base portion having a width A extending in a circumferential direction of said first and second soft magnetic members, the head portion having a width B extending in the circumferential direction which is smaller than the width A, the widths A and B being selected to meet relations below $$0.6 \times F < L < 1.2 \times F$$

$$A < 0.5 \times P$$

$$B < 0.15 \times P$$

where F is a distance between said first and second soft magnetic members in the direction of the alignment of said first and second shafts, L is a length of each of the claws from the base portion to the head portion, and P is a distance between one of outer edges of each of the claws of the first soft magnetic member and one of outer edges of an adjacent one of the claws of the second magnetic member which lies on the same side as the first soft magnetic member in the circumferential direction of the first and second soft magnetic members.

2. A torque sensor as set forth in claim 1, further comprising auxiliary soft magnetic members which have magnetic flux collecting portions, respectively, which serve to collect the magnetic flux from said first and second soft magnetic members at said magnetic sensor.

3. A torque sensor as set forth in claim 1, wherein each of said first and second soft magnetic members has a ring-shaped flange to which the claws are affixed, the base portion of each of the claws extending from the ring-shaped flange, the head portion extending from the base portion.

4. A torque sensor as set forth in claim 1, wherein said magnetic sensor is disposed within the given gap between said first and second soft magnetic members to measure the density of magnetic flux flowing between said first and second soft magnetic members.

5. A torque sensor as set forth in claim 2, wherein the magnetic flux collecting portions of said auxiliary soft magnetic members are opposed to each other in the direction of alignment of said first and second shafts, and wherein said magnetic sensor is interposed between the magnetic flux collecting portions to measure the density of magnetic flux flowing between said first and second soft magnetic members through the magnetic flux collecting portions.

6. A torque sensor comprising:

a first shaft;

a second shaft;

an elastic member coupling said first shaft to said second shafts in alignment with each other, upon input of torque, said elastic member undergoing torsion;

a hard magnetic member joined to said first shaft, said hard magnetic member having magnetic poles arrayed on a periphery thereof to produce a magnetic field therearound;

an assembly of a first and a second soft magnetic member which is joined to said second shaft and placed around said hard magnetic member within the magnetic filed produced by said hard magnetic member to form a magnetic circuit so that upon a change in position of the first and second magnetic members relative to said hard magnetic member arising from the torsion of said elastic member, density of magnetic flux developed within the magnetic circuit changes; and a magnetic sensor placed in non-contact with said first and second soft magnetic members, working to measure the density of magnetic flux within the magnetic circuit, wherein said first and second soft magnetic members are opposed to each other through a given gap in a direction of the alignment of said first and second shafts, said first and second soft magnetic members having as many claws as the poles of said hard magnetic member which are arrayed at regular intervals on peripheries of said first and second soft magnetic members, respectively, each of the claws of said first soft magnetic member being interposed between adjacent two of the claws of said second soft magnetic member, each of the claws having a base portion and a head portion, the base portion having a width A extending in a circumferential direction of said first and second soft magnetic members which is greater than a width of the head portion extending in the circumferential direction, the width A and a distance P between one of outer edges of each of the claws of the first soft magnetic member and one of outer edges of an adjacent one of the claws of the second magnetic member which lies on the same side as the first soft magnetic member in the circumferential direction of the first and second soft magnetic members meeting a relation below $0.5 \times P < A < P.$ 7. A torque sensor as set forth in claim 1, further comprising an auxiliary soft magnetic member which has a magnetic flux collecting portion serving to collect the magnetic flux from said first and second soft magnetic members at said magnetic sensor.

* * * * *